(12) United States Patent
Vijayan et al.

(10) Patent No.: US 10,855,791 B2
(45) Date of Patent: Dec. 1, 2020

(54) CLUSTERED STORAGE SYSTEM PATH QUIESCENCE ANALYSIS

(71) Applicant: NetApp, Inc., Sunnyvale, CA (US)

(72) Inventors: Gunalan Perumal Vijayan, Tamil Nadu (IN); William D. Dallas, Merrimack, NH (US); Sridhar Balachandriah, Bangalore (IN); Bhaskar Singhal, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 457 days.

(21) Appl. No.: 14/553,473

(22) Filed: Nov. 25, 2014

(65) Prior Publication Data

US 2016/0149828 A1    May 26, 2016

(51) Int. Cl.
   *H04L 29/08*    (2006.01)
   *H04L 12/24*    (2006.01)

(52) U.S. Cl.
   CPC .......... *H04L 67/2814* (2013.01); *H04L 41/12* (2013.01); *H04L 41/145* (2013.01); *H04L 41/082* (2013.01); *H04L 41/5025* (2013.01)

(58) Field of Classification Search
   CPC ... H04L 12/2602; H04L 41/147; H04L 43/16; H04L 41/5019; H04L 47/805; H04L 49/205; H04L 67/2814; H04L 45/00; H04L 41/12; H04L 41/0654; H04L 41/0663; H04L 41/08; H04L 41/0668; H04L 45/02; H04L 45/22; H04L 45/28; H04L 45/586; H04L 49/357; H04L 49/70; H04L 43/0811; H04L 67/1097; H04L 43/0823; H04L 49/00; H04L 45/125; H04L 41/5009; H04L 41/5003; H04W 4/008; H04W 12/02; H04W 12/06; H04W 28/18; H04W 48/18; H04W 76/02; H04W 88/06; H04W 36/12; H04W 72/04; H04W 84/047; H04W 88/16; G06F 11/1666; G06F 11/2076; G06F 2009/4557; G06F 2009/45595; G06F 3/067; G06F 9/5083; G06F 9/505; G06F 3/061; G06F 11/2094; G06F 11/3048

(Continued)

(56) References Cited

U.S. PATENT DOCUMENTS 6,578,160 B1 * 6/2003 MacHardy, Jr. ..... G06F 11/0709
                                                         709/223
7,711,978 B1 * 5/2010 Roy ...................... G06F 11/201
                                                          714/43

(Continued)

*Primary Examiner* — Tonia L Dollinger
*Assistant Examiner* — Linh T. Nguyen
(74) *Attorney, Agent, or Firm* — Troutman Pepper Hamilton Sanders LLP (Rochester)

(57) ABSTRACT

A request that indicates a component that can be quiesced is received at a first node. It is determined that quiescence of the component might impact an endpoint. A request for identification of at least one path between a second node and the endpoint is sent to the second node. It is determined, based on a response received from the second node, whether the endpoint will be accessible to the second node if the component is quiesced. In response to a determination that the endpoint will be accessible to the second node if the component is quiesced, a positive analysis outcome is indicated. In response to a determination that the endpoint will not be accessible to the second node if the component is quiesced, a negative analysis outcome is indicated.

12 Claims, 6 Drawing Sheets

(58) Field of Classification Search
USPC ....... 709/232, 238, 242, 223, 224, 239, 220, 709/226, 227, 228; 370/221, 299, 401, 370/465, 217, 248, 386; 714/4.1, 43, 714/47.2, 48, 56
See application file for complete search history.

(56) References Cited

U.S. PATENT DOCUMENTS

| | | | | |
|---|---|---|---|---|
| 7,937,481 B1* | 5/2011 | Sandstrom | ............ | G06F 11/004 709/219 |
| 8,108,732 B2* | 1/2012 | Coronado | ........... | G06F 11/0727 370/225 |
| 8,281,033 B1* | 10/2012 | Riordan | ................. | G06F 3/061 709/231 |
| 9,465,550 B1* | 10/2016 | Lippitt | ................. | G06F 3/0613 |
| 2003/0021223 A1* | 1/2003 | Kashyap | ................. | H04L 12/56 370/217 |
| 2006/0075156 A1* | 4/2006 | Okaki et al. | ............. | G06F 3/00 710/17 |
| 2006/0092941 A1* | 5/2006 | Kusama | ................. | H04L 12/56 370/392 |
| 2006/0236061 A1* | 10/2006 | Koclanes | ............. | G06F 3/0605 711/170 |
| 2007/0055797 A1* | 3/2007 | Shimozono | ......... | G06F 11/2005 710/36 |
| 2007/0113005 A1* | 5/2007 | Yamamoto | ............ | G06F 3/0625 711/112 |
| 2007/0168705 A1* | 7/2007 | Dohi | .................... | G06F 11/008 714/6.11 |
| 2009/0265577 A1* | 10/2009 | Haramai | .............. | H04L 41/0677 714/3 |
| 2009/0319822 A1* | 12/2009 | Coronado | ........... | G06F 11/0727 714/3 |
| 2010/0138686 A1* | 6/2010 | Arata | .................. | G06F 11/2025 714/4.1 |
| 2011/0007652 A1* | 1/2011 | Bai | ..................... | H04L 12/5695 370/252 |
| 2011/0228670 A1* | 9/2011 | Sasso | .................. | H04L 41/0668 370/221 |
| 2012/0233494 A1* | 9/2012 | Sandstrom | .......... | G06F 11/0727 714/4.1 |
| 2012/0311566 A1* | 12/2012 | Takaoka | .............. | H04L 41/5035 718/1 |
| 2014/0053014 A1* | 2/2014 | MacQuarrie | ........ | G06F 11/0793 714/4.2 |
| 2014/0347975 A1* | 11/2014 | Yoshimoto | .............. | H04L 45/28 370/218 |
| 2015/0046601 A1* | 2/2015 | Kobashi | ................ | H04L 41/06 709/239 |
| 2015/0261562 A1* | 9/2015 | Gong | .................... | G06F 9/5005 718/1 |
| 2016/0014015 A1* | 1/2016 | Mangin | ................... | H04L 45/22 370/218 |

* cited by examiner

CLUSTERED STORAGE SYSTEM PATH QUIESCENCE ANALYSIS

BACKGROUND

Aspects of the disclosures herein generally relate to the field of storage systems, and, more particularly, to impact analysis of component quiescence in clustered storage systems.

Clustered storage systems typically include multiple interconnected nodes that manage storage devices and handle storage operations directed to those storage devices. The nodes are connected to the various storage devices, which can include hard drives, solid state drives, storage arrays, etc. The nodes and storage devices are interconnected using various networking components and can include redundant hardware and connections. Although possibly comprising multiple storage devices, a clustered storage system can be configured to provide a single consistent view of the storage devices and allow block-level access, file-level access, object-level access, etc. (or a combination thereof) to the storage devices.

OVERVIEW

During operation of a clustered storage system, components might be replaced, maintenance operations performed, etc., resulting in communication paths becoming inactive. When a path becomes inactive, data may become inaccessible. Even if the clustered storage system can be reconfigured to allow access to the data via another path, service level objectives might be violated or performance degraded. However, a node or multiple nodes of the clustered storage system can analyze the configuration of the clustered storage system and determine the impact of inactive paths prior to the particular action being performed. Thus, the clustered storage system can reduce the possibility of a detrimental impact by preventing the action or providing forewarning of the possible detrimental impact.

BRIEF DESCRIPTION OF THE DRAWINGS

The disclosures herein may be better understood by referencing the accompanying drawings.

DESCRIPTION OF EXAMPLE ILLUSTRATION(S)

Figure 1:
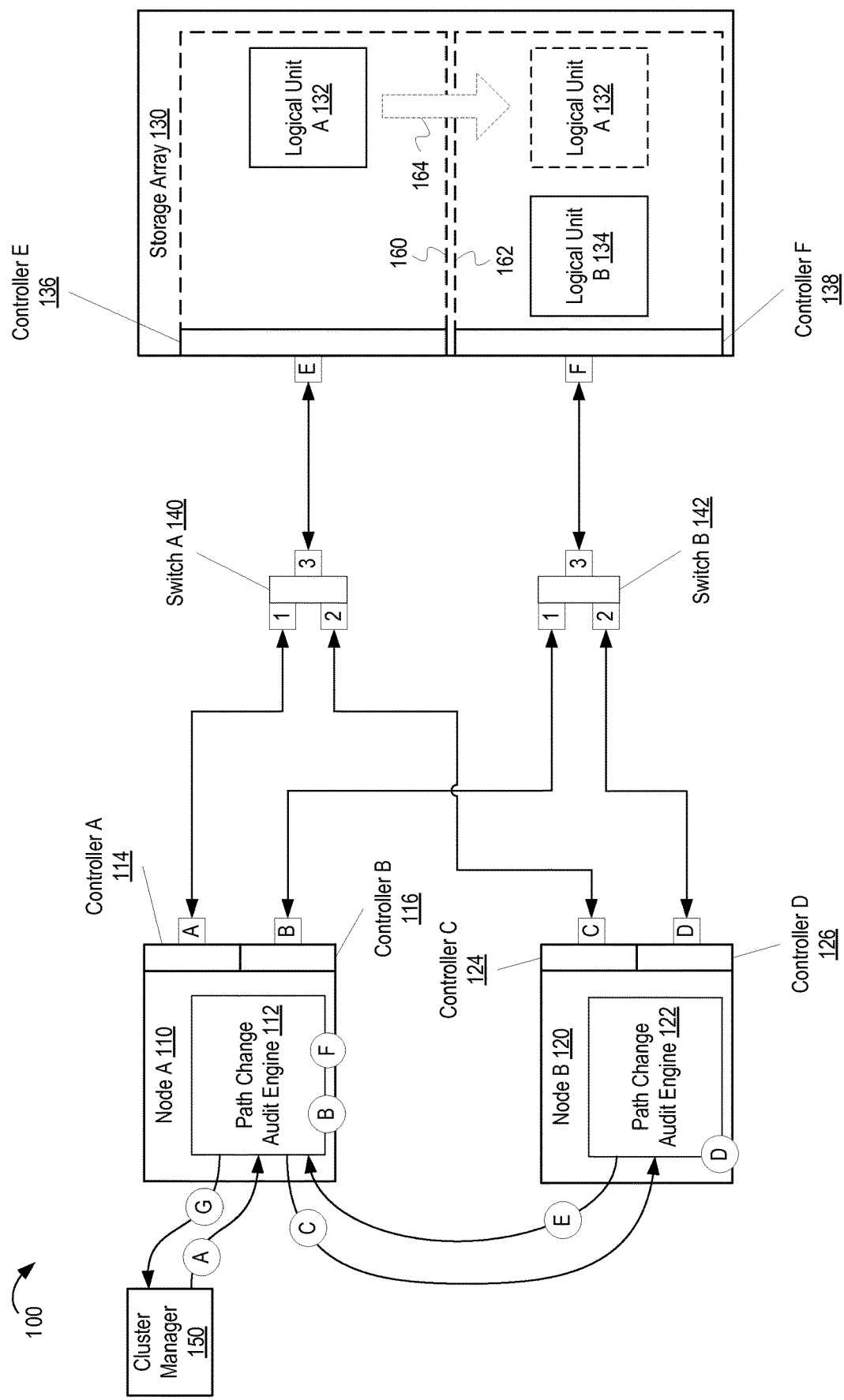
FIG. 1 depicts an example cluster with a path change audit engine.

The description that follows includes example systems, methods, techniques, instruction sequences and computer program products that embody techniques of the disclosures herein. However, it is understood that the described features may be practiced without these specific details. For instance, although examples refer to logical unit numbers, various logical resources, such as volumes and partitions, can be used. In other instances, well-known instruction instances, protocols, structures and techniques have not been shown in detail in order not to obfuscate the description.

Clustered storage systems (hereinafter "clusters") are typically designed to allow access to data within the cluster even if some portion of the cluster fails. For example, a network switch used to connect a node of a cluster to a storage device might fail. However, the cluster might have a second network switch that also connects the node to the storage device. When the first network switch fails, the node can communicate with the storage device using the second network switch.

The components of the cluster (such as nodes and storage devices) communicate over a network using various paths. In the above example, a first path between the node and the storage device passes through the first network switch and a second path between the node and the storage device passes through the second network switch. The failure of the first network switch results in a failure of the first path.

Each path within a cluster allows access to at least a subset of the data stored in the cluster. The subset of the data accessible via a path is referred to herein as an "endpoint". Although endpoints can be physical resources, endpoints can also be logical resources. A logical resource is a grouping of data within the cluster that is not solely restricted to physical boundaries. For example, a logical resource can be a partition of a storage device (i.e., a subset of the actual physical storage) or can comprise data spread across multiple storage devices. Regardless of the particular configuration of a logical resource, a logical grouping of data accessible by one or more paths within a cluster is an endpoint. Specific examples of logical resources include partitions, volumes, files, and logical units.

Communications along the paths may be halted for reasons other than hardware failures. For example, hardware might be replaced, configuration settings changed, etc. Temporarily deactivating a path is referred to as "quiescing" the path. A node of a cluster (the "managing node") can receive an indication that a path is being quiesced, and can thus analyze the impact of the path quiescence prior to the actual quiescence. In conjunction with the other nodes of the cluster, a managing node analyzes the state and configuration of the cluster and determines the potential impact of the path quiescence. Thus, the analysis is not limited to the particular portion of the cluster associated with the managing node itself (i.e., the paths that originate at the managing node). Based on this analysis, the managing node indicates whether the path quiescence should be performed and/or provides data indicating the potential impact of the path quiescence.

The particular factors that go into the path quiescence analysis can vary between clusters based on the particular cluster configuration, protocols used, etc. Typically, the managing node determines whether quiescence of the path will impact the availability of the endpoint(s) accessible via the path. An endpoint can be actually unavailable or constructively unavailable. For example, if only one path to an endpoint is available, quiescence of that path results in the endpoint being actually unavailable. If an alternate path to an endpoint is available but is experiencing a large number of errors, quiescence of the original path results in the endpoint being constructively unavailable.

The managing node can also determine the potential impact resulting from the quiescence of the path. For example, the managing node might determine that using an alternate path to the endpoint might increase latency by ten percent or reduce the number of input/output operations per second ("IOPS") by a particular amount. Relatedly, the managing node can also determine whether the quiescence of a path might result in a violation of a service level objective. Service level objectives define one or more performance characteristics that the cluster is expected to meet. For example, a service level objective for a particular endpoint might specify that the cluster should support a sustained throughput of 1000 IOPS to the endpoint. The managing node might determine that an alternate path to the endpoint cannot support a sustained throughput of 1000 IOPS, thus potentially resulting in a violation of the service level objective.

It should be noted that various components within a cluster can be "quiesced". For example, a controller might be quiesced, resulting in each path that terminates at the controller being quiesced. Thus, the descriptions below sometimes refer to quiescing a component, such as a controller, instead of a path. Further, a "component", for the purposes of quiescing, can be any component within the cluster that, if deactivated, removed, etc., results in one or more paths being quiesced. The component can be a software component, hardware component, or combination thereof. Further, for the purposes of the descriptions herein, a path, target port, initiator port, etc., whether physical or virtual, is considered a component.

FIG. 1 depicts an example cluster with per-node path change audit engines. FIG. 1 depicts a cluster 100, including node A 110 and node B 120, a storage array 130, and a cluster manager 150. Node A 110 includes a path change audit engine (hereinafter "audit engine") 112 and node B 120 includes an audit engine 122. Node A 110 includes controller A 114 and controller B 116. Node B 120 includes controller C 124 and controller D 126. The storage array 130 includes controller E 136 and controller F 138. Controller A 114, controller B 116, controller C 124, and controller D 126 are collectively referred to as the "node controllers". Controller E 136 and controller F 138 are collectively referred to as the "storage array controllers". Each controller is associated with a port: controller A 114 is associated with port A; controller B 116 is associated with port B; controller C 124 is associated with port C; controller D 126 is associated with port D; controller E 136 is associated with port E; and controller F 138 is associated with port F. The ports may be physical ports or virtual ports and ports associated with node controllers are referred to as "initiator ports" while ports associated with storage array controllers are referred to as "target ports".

The storage array 130 can comprise multiple physical storage devices (not depicted), such as hard drives, solid state drives, etc. The storage array 130 is configured to host two logical resources, logical unit A 132 and logical unit B 134. Logical resources can be assigned to a particular storage controller. The logical resources assigned to controller E 136 and controller F 138 are indicated by box 160 and box 162, respectively. In the example depicted in FIG. 1, logical unit A 132 is assigned to controller E 136 and logical unit B 134 is assigned to controller F 138. The nodes themselves reference the logical resources by the target port associated with the controller that the logical resources are assigned to. For example, to access logical unit A 132, node A 110 would send an operation to target port E. Thus, the logical resources can also be viewed as being assigned to target ports, and, in some configurations, the logical resources are actually assigned to target ports, not controllers.

Each node controller is coupled with a storage array controller via switch A 140 or switch B 142, creating a path between the respective node and the storage array 130. The path is identified by the corresponding initiator port and target port. For example, controller A 114 is coupled with controller E 136 via switch A 140, creating path A-E between node A 110 and storage array 130. Additionally, controller B 116 is coupled with controller F 138 via switch B 142, creating path B-F; controller C 124 is coupled with controller E 136 via switch A 140, creating path C-E; and controller D 126 is coupled with controller F 138 via switch B 142, creating path D-F. The use of multiple controllers per node/storage device allows for redundancy in case a controller or other path component (e.g., switch A 140) fails. Further, each controller might be configured to optimize access to certain types of data, discussed in further detail below.

The cluster manager 150 can exist as a separate entity from the nodes, as depicted in FIG. 1, or can be part of one of the nodes. For example, the cluster manager 150 might be an application running on a client that communicates with one or more nodes of the cluster 100. As another example, the cluster manager 150 might be an application running directly on one of the nodes. FIG. 1 depicts cluster manager 150 as a separate entity that communicates with node A 110. Thus, node A 110 is the managing node of the cluster 100. Some clusters might distribute the management duties among the nodes, thus allowing any node to act as the managing node. While the current example depicts the cluster manager 150 as part of the cluster 100 itself, the cluster manager 150 can be defined as existing outside of the cluster 100. Further, while cluster manager 150 might provide an interface that allows users to interact with the cluster 100, cluster manager 150 might also facilitate functionality including automated and/or periodic management tasks.

The specific operations performed by the audit engine 112 and the audit engine 122 can differ. In this example, audit engine 112 is located on the managing node (node A 110), and thus performs additional operations that the audit engine 122 does not. The audit engine 112 and the audit engine 122 might be implemented similarly, but perform different functions based on the role of the particular node they are located on. Thus, if node B 120 became the managing node, the audit engine 122 could function appropriately. However, the audit engine 112 and audit engine 122 can be implemented differently. For example, the audit engine 122 might be implemented to perform only the particular operations associated with a non-managing node.

Stages A through G depict example operations performed by the cluster 100 to determine the impact of a possible component quiescence.

At stage A, the audit engine 112 of node A 110 receives a request from the cluster manager 150 to analyze the impact of quiescing controller E 136. The request identifies controller E 136 and can also include other information, such as how long controller E 136 might be quiesced for, whom or what is requesting that controller E 136 be quiesced, and a particular time controller E 136 might be quiesced.

At stage B, the audit engine 112 determines which endpoints might be impacted if controller E 136 is quiesced. To determine which endpoints might be impacted, the audit engine 112 determines which target ports are associated with controller E 136. In this particular example, controller E 136 is associated with target port E. The audit engine 112 then determines which endpoints are assigned to controller E 136 by determining which endpoints are accessible via target port E. In this particular example, logical unit A 132 is the only endpoint accessible via target port E. Thus, if controller E 136 is quiesced, logical unit A 132 might not be accessible.

Once the audit engine 112 determines that logical unit A 132 would be impacted by the quiescence of controller E 136, the audit engine 112 determines whether the cluster configuration can be updated to provide an alternate path to logical unit A 132. In this particular example, cluster 100 allows logical resources to be reassigned from one controller to another. Thus, the audit engine 112 determines that logical unit A 132 can be reassigned to controller F 138, as indicated by arrow 164. If reassigned to controller F138, logical unit A 132 would become accessible via target port F.

At stage C, the audit engine 112 sends to the audit engine 122 a request for identification of and status information for paths from node B 120 to target port F. In other words, the audit engine 112 requests information that will allow the audit engine 112 to determine whether node B 120 will be able to access logical unit A 132 if logical unit A 132 is reassigned to controller F 138. The particular status information requested can vary depending on the cluster configuration. However, the status information can include error-related data, service level objectives for logical resources accessible via the paths, and current or historical measurements of performance, traffic, and/or other activity.

At stage D, the audit engine 122 identifies path D-F as the only path from node B 120 to target port F. The audit engine 122 further gathers the requested data for path D-F. For example, the audit engine 122 determines the error rate (or other measure of errors), data associated with any service level objectives associated with logical unit B 134, and various measurements of performance Examples of service level objective data and performance measurements include average latency, maximum latency, average throughput, maximum throughput, etc.

At stage E, the audit engine 122 returns the requested data to the audit engine 112.

At stage F, the audit engine 112 determines the impact that could result from quiescence of controller E 136. To determine the impact, the audit engine 112 determines whether logical unit A 132 would become unavailable to any node of the cluster 100. In this particular example, the audit engine 112 determines whether all nodes have at least one path to target port F. To determine whether node A 110 has a path to target port F, the audit engine 112 analyzes topology information associated with node A 110. In this example, the audit engine 112 determines that node A 110 can access target port F via path B-F. To determine whether node B 120 has a path to target port F, the audit engine 112 references the data received from the audit engine 122 at stage E. Based on the data received from the audit engine 122, the audit engine 112 determines that node B 120 can access target port F via path D-F.

Once the audit engine 112 identifies the paths to target port F, the audit engine 112 determines whether the paths to target port F are viable paths. An unviable path is a path that exists but is determined to be unusable. For example, a path may be unviable if the path is experiencing too many errors. As another example, a path may be unviable if use of the path might result in a service level objective violation.

To determine whether path B-F is experiencing too many errors, the audit engine 112 determines whether status information associated with path B-F indicates that the error rate or other error measurement is greater than a threshold. Similarly, to determine whether path D-F is experiencing too many errors, the audit engine 112 determines whether the data received from the audit engine 122 at stage E indicates that path D-F has an error rate or other error measurement greater than the threshold.

To determine whether the use of a path might result in a service level objective violation, the audit engine 112 first determines service level objectives associated with logical resources accessible via the path. In this example, the audit engine 112 determines the service level objectives associated with logical unit A 132 and logical unit B 134 because logical unit A 132 and logical unit B 134 would be accessed via paths B-F and D-F.

Service level objectives can be defined in a variety of manners. For example, service level objectives might be defined on a per-application, cluster, node, path, and/or endpoint basis. To determine a service level objective defined on a per-application basis, the audit engine 112 determines which applications are associated with logical unit A 132 and logical unit B 134. The audit engine 112 then determines the service level objectives associated with the applications. If the audit engine 122 returned service level objective information for logical unit B 134, the audit engine 112 can access the returned data to determine the service level objectives associated with logical unit B 134.

Once the audit engine 112 determines which service level objectives might be impacted by the quiescence of controller E 136, the audit engine analyzes the cluster 100 to determine whether a service level violation might occur. The particular operations performed to determine whether a service level objective might occur can vary depending on the service level objective, cluster configuration, etc. As an example, assume that the cluster 100 is configured with two service level objectives. The first service level objective specifies that the cluster 100 should be able to support a maximum throughput of 1000 IOPS to logical unit A 132. The second service level objective specifies that the cluster 100 should be able to support a maximum throughput of 1000 IOPS to logical unit B 134.

The first determination that the audit engine 112 makes is whether a service level objective violation might occur if logical unit A 132 is reassigned to controller F 138. To determine whether a service level objective violation might occur, the audit engine 112 might determine the maximum throughput for each of the paths that will be used (B-F and D-F) and the maximum throughput for each of the individual components along the paths. The audit engine 112 can then determine whether the maximum throughput for each of the paths and/or components can support the service level objectives. For example, consider a scenario in which controller F 138 has a maximum throughput of 1500 IOPS. Because logical unit A 132 and logical unit B 134 both have service level objectives of 1000 IOPS, controller F 138 would need to support 2000 IOPS to be able to support the service level objectives of both logical unit A 132 and logical unit B 134. Thus, a service level objective violation might occur.

The audit engine 112 also quantifies the impact that quiescence of controller E 136 might have on the cluster 100. Consider a scenario in which logical unit A 132 contains data associated with a database and logical unit B 134 contains data associated with a streaming media server. Data associated with a database might exhibit characteristics such as read/write operations from/to random locations. Data associated with a streaming media server, on the other hand, might exhibit characteristics such as many read operations from sequential locations and infrequent write operations. A controller optimized for data associated with a streaming media server might support greater prefetching of data and larger I/O operations than a controller optimized for a database. Thus, two controllers that have identical hardware configurations might offer differing performance depending on the particular data the controllers are serving.

The audit engine 112 can thus determine the impact that reassigning logical unit A 132 to controller F 138 will have on the performance of the cluster 100 as it relates to logical unit A 132. For example, the audit engine 112 might determine that while controller F 138 can support 1500 IOPS when servicing logical unit B 134, controller F 138 might only be capable of 1000 IOPS when servicing logical unit A 132. The audit engine 112 can thus determine that quiescing controller E 136 might result in a drop in performance associated with logical unit A 132 of 500 IOPS. The audit engine 112 can also factor this difference into the determination of whether a service level objective violation might occur. The audit engine 112 can perform a similar analysis regarding logical unit B 134, as well as determining the impact that the combined traffic to and from logical unit A 132 and logical unit B 134 might have on the performance of the cluster 100.

At stage G, the audit engine 112 returns the results of the analysis to the cluster manager 150. The results of the analysis indicate whether impediments exist to quiescing the controller E 136 and can also include the various data determined about the impact of quiescing the controller E 136 on the cluster 100. For example, the results might indicate which paths will be quiesced, which endpoints are impacted, whether a service level objective violation will occur, the impact on service level objectives, etc. The specific results returned can vary depending on the entity that requested the analysis. For example, if the analysis was requested by a software component, the results returned may be a Boolean value indicating whether quiescing controller E 136 would result in an endpoint being unavailable or a possible service level objective violation (referred to as a "fatal" impact). If the analysis was requested by a user, the results returned might include data indicating the results of the entire analysis.

The specific order in which the stages described above are performed, and/or the specific operations performed at the individual stages can vary. For example, the audit engine 112 might determine whether node A 110 has a path to controller F 138 at stage B instead of stage F. Further, the audit engine 112 might perform some analysis of service level objectives at stage B instead of stage F. For example, the audit engine 112 might determine, at stage B, whether quiescing controller E 136 might result in a violation of a service level objective associated with path B-F.

Similarly, the audit engine 122 of node B 120 might perform some analysis of the service level objectives that apply to node B 120 at stage D. For example, the audit engine 122 might determine whether quiescing controller E 136 might violate a service level objective associated with path D-F, and, if so, indicate the fact to the audit engine 112 without performing additional analysis.

The audit engines 112 and 122 might be configured to stop performing the analysis early if certain conditions exist. For example, the audit engine 112 might be configured to stop performing any analysis if it is determined, at stage B, that no path from node A 110 to controller F 138 exists. Thus, in some scenarios, only a subset of the operations depicted at stages B-F might be performed.

Further, the request received at stage A can vary. For example, instead of indicating controller E 136, the request might specify path A-E. Such a scenario might occur if hardware, like a cable, between controller A 114 and switch A 140 is being replaced. Because controller E 136 would remain functional, such a scenario might not directly impact node B 120. In other words, node B 120 would still be able to access controller E 136. However, because node A 110 would not be able to access logical unit A 132, the results of the analysis described above remain the same. As other examples, the request might specify target port E, initiator port A, or a software component.

Figure 2:
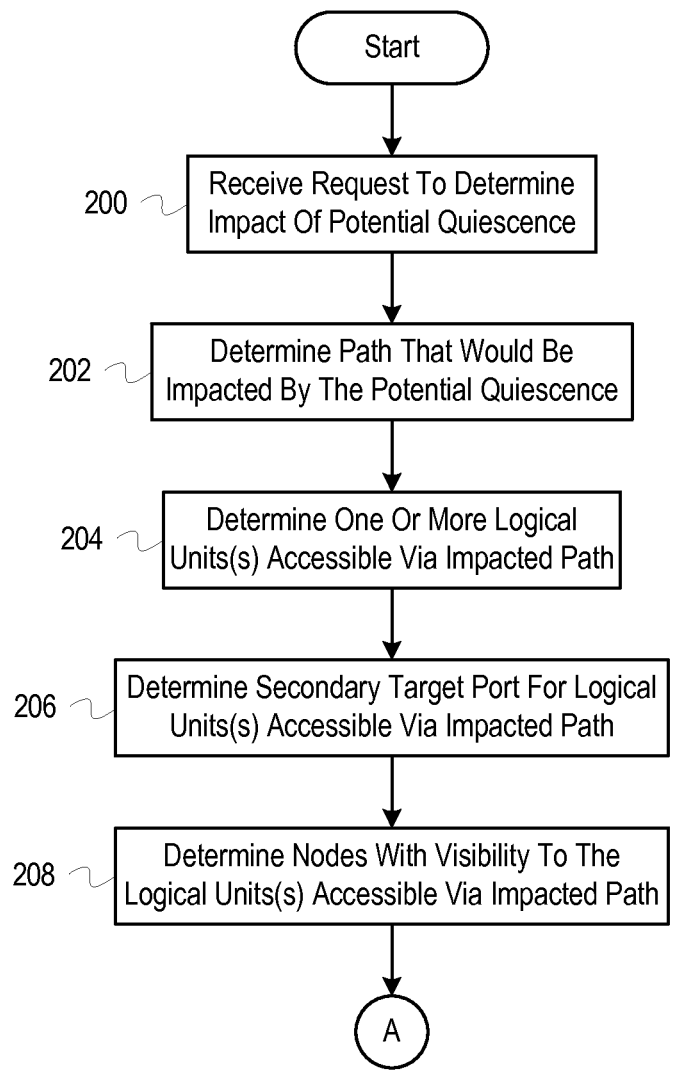
FIG. 2 depicts a flowchart of example operations for determining the impacted path, logical unit(s), and impacted nodes for a potential quiescence.
Figure 3:
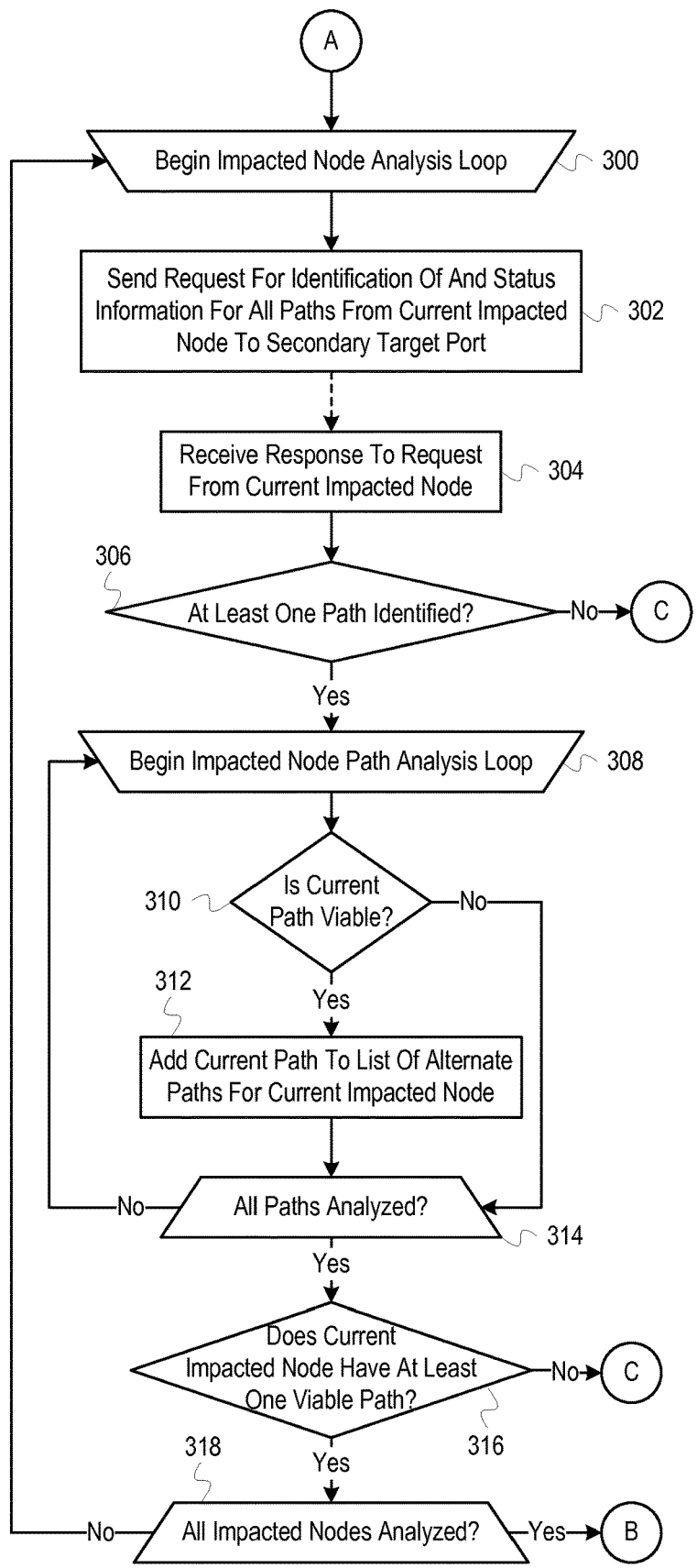
FIG. 3 depicts a flowchart of example operations for viable alternate paths to the one or more logical unit(s) accessible via the impacted path.
Figure 4:
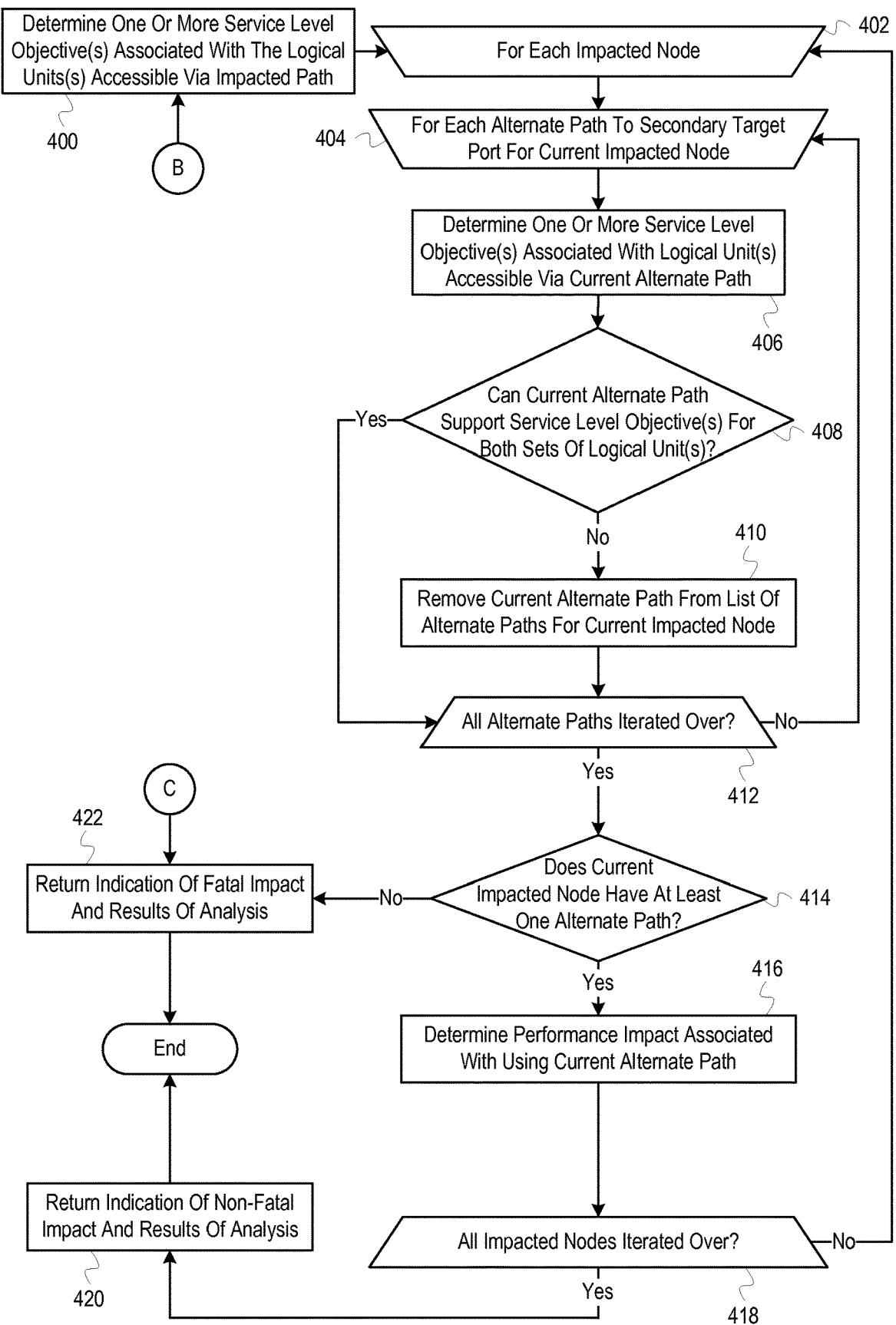
FIG. 4 depicts example operations for analyzing the impact of the potential quiescence on the cluster.

FIGS. 2-4 depict flowcharts of example operations for determining the impact of quiescing a path. The operations depicted in FIGS. 2-4 can be performed by a node of a cluster (e.g., node A 110 of FIG. 1) or any suitable component. Instead of describing logical units as being assigned to controllers, the example depicted in FIGS. 2-4 describe logical units as being assigned to target ports. This better reflects the manner in which a node typically views a logical unit. Further, the target port that a logical unit is initially assigned to is referred to as the "primary target port" and any target port that the logical unit can be reassigned to is referred to as a "secondary target port".

Additionally, in order to simplify the description, the example depicted in FIGS. 2-4 makes several assumptions. First, it is assumed that only one path is impacted. When multiple paths are impacted, the operations can be repeated for each path as appropriate. Second, it is assumed that all logical units accessible via the impacted path are reassigned to the same secondary target port. Third, it is assumed that each node is coupled with one target port of a target port group. Adaptations based on configurations that do not follow the latter two assumptions are discussed after the description of FIGS. 2-4.

FIG. 2 depicts a flowchart of example operations for determining the impacted nodes for a potential quiescence.

At block 200, a node of a cluster receives a request to determine the impact of a potential quiescence. The request can be received from a cluster manager and can be generated by an automated process, user, etc. The request can indicate a particular component within the cluster that is the target of the potential quiescence. The component can be a physical component, logical resource, path, etc. A path can be specified by a target port, an initiator port, or a combination thereof. The request can also indicate then length of time that the component might be quiesced and the time that the quiescence might begin. After the node receives the request to determine the impact of the potential quiescence, control then flows to block 202.

At block 202, the node determines the path that would be impacted by the potential quiescence (hereinafter "impacted path"). If the request explicitly indicates a path, the node might not perform any additional operations beyond extracting a path identifier from the request. If the request specifies a non-path component, the node might determine a path associated with the non-path component. For example, if the request specifies a controller, the node determines which target port is associated with the controller. After the node determines the path that would be impacted by the potential quiescence, control then flows to block 204.

At block 204, the node determines one or more logical unit(s) that are accessible via the impacted path. To determine the logical unit(s) accessible via the impacted path, the node accesses cluster topology data that indicates the relationship between logical units and paths. The topology data typically specifies which target port each logical unit is assigned to. Thus, the node can determine the target port of the impacted path and use the determined target port to look up the particular logical unit(s) accessible via the determined target port. The node might communicate with other nodes to determine the logical unit(s). For example, the node might send requests to the other nodes of the cluster requesting that each node identify any logical units accessible via the path. After the node determines the logical unit(s) that are accessible via the impacted path, control then flows to block 206.

At block 206, the node determines the secondary target port for the logical unit(s) accessible via the impacted path. The node determines the secondary target port for the logical unit(s) accessible via the impacted path by accessing cluster configuration data. The cluster configuration data includes data specifying the particular target ports that a logical unit can be assigned to. The cluster configuration data can also include the cluster topology data described above. The node uses a logical unit identifier to look up the configuration data associated with the particular logical unit identified by the logical unit identifier. The node then extracts the secondary target port for the particular logical unit from the configuration data associated with the particular logical unit. This process can be repeated for each logical unit. After the node determines the secondary target port for the logical unit(s) accessible via the impacted path, control then flows to block 208.

At block 208, the node determines the nodes of the cluster (hereinafter "impacted nodes") with visibility to the logical unit(s) accessible via the impacted path. In other words, the node determines which nodes of the cluster are configured to access the logical unit(s). To determine which nodes of the cluster are configured to access the logical unit(s), the node can access the cluster configuration data. The cluster configuration data indicates which nodes can access a particular logical unit. The cluster configuration data might not indicate which nodes can access a particular logical unit directly, but might indicate which nodes include paths with particular target ports. The node can thus determine which nodes can access a particular logical unit by determining which nodes include paths that terminate at the target port the logical unit is currently assigned to. After the node determines the impacted nodes, control then flows to block 300 of FIG. 3.

FIG. 3 depicts a flowchart of example operations for determining viable alternate paths to the logical unit(s) accessible via the impacted path.

Control flowed to block 300 from block 208 of FIG. 2. At block 300, the node begins an impacted node analysis loop. During the impacted node analysis loop, the node iterates over the impacted nodes determined at block 208 of FIG. 2. During the first pass through block 300, the node selects a first of the impacted nodes as the current impacted node. On each subsequent pass through block 300, the node selects a previously unselected impacted node as the current impacted node. After the node initializes or updates the current impacted node, control then flows to block 302.

At block 302, the node sends a request for identification of all paths from the current impacted node to the secondary target port for the logical unit(s). The request also includes a request for status information for all of the paths. The status information can include error-related data, performance data, etc. After the node sends the request for identification of all paths from the current impacted node to the secondary target port for the logical unit(s), control then flows to block 304.

At block 304, the node receives a response from the current impacted node. The response identifies all paths from the current impacted node to the secondary target port for the logical unit(s) and includes status information for each of the identified paths. The paths can be identified by their respective initiator ports and target ports. After the node receives the response from the current impacted node, control then flows to block 306.

At block 306, the node determines whether at least one path was identified in the response from the current impacted node. If at least one path was identified in the response from the current impacted node, control then flows to block 308. If no paths were identified in the response from the current impacted node, control then flows to block 422 of FIG. 4.

At block 308, the node begins an impacted node path analysis loop. During the impacted node path analysis loop, the node iterates over the paths identified in the response from the current impacted node. During the initial pass through block 308, the node selects a first of the paths identified in the response from the current impacted node as the current path. On subsequent passes through block 308, the node selects a previously unselected path from the response received at block 304 as the current path. After the node initializes or updates the current path, control then flows to block 310.

At block 310, the node determines whether the current path is a viable path. To determine whether the current path is a viable path, the node determines whether the current path is experiencing a high number of errors. In particular, current impacted node includes a measurement of the errors on the current path with the status information for the current path. The particular measurement of the errors on the current path used can vary. For example, the severity can be indicated using an error rate, error count, or other measurement. The node compares the measurement of the errors with a threshold. If the indication of the severity of errors is greater than the threshold, the node determines that the current path is not viable. If the current node determines that the current path is viable, control then flows to block 312. If the current node determines that the current path is not viable, control then flows to block 314.

At block 312, the node adds the current path to a list of alternate paths for the current impacted node. An alternate path is a path other than the path to the primary target port with which the current impacted node can access the logical unit(s) (after the logical unit(s) are switched to a secondary target port). After the node adds the current path to the list of alternate paths for the current impacted node, control then flows to block 314.

Control flowed to block 314 if it was determined, at block 310, that the current path is not viable. Control also flowed to block 314 from block 312. At block 314, the node determines whether all paths have been analyzed. If all paths have been analyzed, control then flows to block 314. If all paths have not been analyzed, control then flows back to block 308.

At block 316, the node determines whether the current impacted node has at least one viable path. In other words, the node determines whether the current impacted node had all identified paths excluded as not being viable. To determine whether the current impacted node has at least one alternate path remaining, the node can determine whether the list of alternate paths for the current impacted node has one or more alternate paths. If the node determines that the current impacted node has at least one viable path, control then flows to block 318. If the node determines that the current impacted node does not have at least one viable path, control then flows to block 422 of FIG. 4.

At block 318, the node determines whether all impacted nodes have been analyzed. If all impacted nodes have been analyzed, control then flows to block 400 of FIG. 4. If all impacted nodes have not been analyzed, control then flows back to block 300.

FIG. 4 depicts example operations for analyzing the impact of the potential quiescence on the cluster.

Control flowed to block 400 if it was determined, at block 318 of FIG. 3, that all impacted nodes had been analyzed. At block 400, the node determines one or more service level objective(s) associated with the logical unit(s) accessible via the impacted path. To determine service level objective(s) associated with the logical unit(s), the node accesses the cluster configuration data and looks up service level objective(s) using logical unit identifiers associated with the logical unit(s). The node can also determine service level objective(s) that are not directly associated with the logical unit(s) but might otherwise be impacted by a cluster configuration change. For example, the cluster might have a service level objective that specifies how many IOPS the cluster as a whole should be capable of handling. Changing the cluster configuration can impact the performance capabilities of the cluster and thus the cluster-related service level objective might be included in the analysis. After the node determines service level objective(s) associated with the logical unit(s), control then flows to block 402.

At block 402, the node begins a loop in which each impacted node is iterated over. During the first pass through block 402, the node selects a first of the impacted nodes as the current impacted node. On each subsequent pass through block 402, the node selects a previously unselected impacted node as the current impacted node. After the node initializes or updates the current impacted node, control then flows to block 404.

At block 404, the node begins a nested loop in which each alternate path from the current impacted node to the secondary target port is iterated over. On each pass through block 404 from block 402, the node selects a first of the alternate paths as the current alternate path. On each other pass though block 404, the node selects a previously unselected alternate path as the current alternate path. After the current alternate path is initialized or updated, control then flows to block 406.

At block 406, the node determines one or more service level objective(s) associated with logical unit(s) accessible via the current alternate path. The node can determine the service level objective(s) in a substantially similar manner to that described above at block 400. After the node determines service level objective(s) associated with the logical unit(s) accessible via the current alternate path, control then flows to block 408.

At block 408, the node determines whether the current alternate path can support the service level objective(s) associated with the logical unit(s) accessible via the impacted path and the service level objective(s) associated with the logical unit(s) accessible via the current alternate path. To put it another way, the node evaluates whether the current alternate path can handle any service level objectives associated with the impacted path in addition to any service level objectives associated with the current alternate path. If the logical unit(s) accessible via the impacted path were reassigned to be accessible via the current alternate path, the current alternate path would support service level objectives for all logical units accessible via the current alternate path. Thus, the node determines whether the current alternate path has the resources and/or bandwidth to support the service level objectives.

The particular operations performed to determine whether the current alternate path can support the service level objective(s) associated with the impacted path and current alternate path can vary depending on the particular service level objective(s). For example, if the service level objective(s) define the average throughput expected, the node can add the service level objective(s) together and determine whether the path can support the combined throughputs. If the service level objective(s) define the average latency, the node can determine the change in latency that might be caused by adding additional traffic to the current alternate path. If the node determines that the current alternate path can support the service level objective(s) associated with the impacted path and the current alternate path, control then flows to block 412. If the node determines that the current alternate path cannot support the service level objective(s) associated with the impacted path and the current alternate path, control then flows to block 410.

At block 410, the current alternate path is removed from the list of alternate paths for the current impacted node. After the current alternate path is removed from the list of alternate paths for the current impacted node, control then flows to block 412.

Control flowed to block 412 if it was determined, at block 408, that the current alternate path could support service level objective(s) associated with the impacted path and the current alternate path. Control also flowed to block 412 from block 410. At block 412, the node determines whether all alternate paths from the current impacted node to the secondary target port have been iterated over. If all alternate paths from the current impacted node to the secondary target port have been iterated over, control then flows to block 414. If all alternate paths from the current impacted node to the secondary target port have not been iterated over, control then flows back to block 404.

At block 414, the node determines whether the current impacted node has at least one alternate path to the secondary target port remaining. To determine whether the current impacted node has at least one alternate path to the secondary target port remaining, the node can determine whether the list of alternate paths for the current impacted node has one or more alternate paths. If the node determines that the current impacted node has at least one alternate path to the secondary target port, control then flows to block 416. If the node determines that the current impacted node does not have at least one alternate path to the secondary target port, control then flows to block 422.

At block 416, the node determines the performance impact associated with using the current alternate path. The particular operations performed by the node to determine the performance impact associated with using the current alternate path can vary. For example, the node might determine the total amount of traffic that would be sent over the current alternate path with the addition of the traffic from the impacted path and compare the total amount of traffic with the performance capabilities of the current alternate path. As another example, the node might look at historical data to determine the impact increased traffic might have on the current alternate path. The node can take into account the various characteristics of the cluster hardware as well. For example, the node might access data that identifies the performance capabilities of a switch along the path to determine the maximum throughput that the switch can handle. After the node determines the performance impact associated with using the current alternate path, control then flows to block 418.

At block 418, the node determines whether all impacted nodes have been iterated over. If the node determines that all impacted nodes have been iterated over, control then flows to block 420. If the node determines that all impacted nodes have not been iterated over, control then flows back to block 402.

At block 420, the node returns an indication that the quiescence would have a non-fatal impact. The node can also return the results of the analysis, including which logical units are impacted, which alternate paths might be used, the performance impact associated using the available alternate paths, etc. The specific data returned by the node can vary depending on the entity that requested the analysis. For example, if an automated maintenance process requested the analysis, the node might return only an indication that the quiescence would have a non-fatal impact. As another example, if a user requested the analysis, the node might return the indication that the quiescence would have a non-fatal impact as well as the results of the analysis. After the node returns at least the indication that the quiescence would have a non-fatal impact, the process ends.

Control flowed to block 422 if it was determined, at block 306 of FIG. 3, that no paths from an impacted node to the secondary target port were identified. Control also flowed to block 422 if it was determined, at block 316 of FIG. 3, that an impacted node does not have at least one viable path. Control also flowed to block 422 if it was determined, at block 414, that an impacted node does not have at least one alternate path after analyzing the service level objective(s). At block 422, the node returns an indication that the quiescence would have a fatal impact. The node can also return the results of the analysis, including what condition results in the fatal impact, the logical units impacted, etc. The specific data returned by the node can vary depending on the entity that requested the analysis, similar to that described above at block 420. After the node returns at least the indication that the quiescence would have a non-fatal impact, the process ends.

As mentioned above, the operations depicted in FIGS. 2-4 assume that only one path is impacted by the potential quiescence. The operations can be adapted for scenarios in which multiple paths are impacted by the potential quiescence. For example, the operations depicted at blocks 204 through blocks 208 of FIG. 2 would be performed for each impacted path. If the operations performed at block 206 of FIG. 2 identified multiple secondary target ports (e.g., one for each path), each of the secondary target ports could be indicated in the request sent to the impacted nodes at block 302 of FIG. 3. Similarly, the operations depicted at blocks 400 through 418 of FIG. 4 would be performed for each impacted path, if appropriate.

The operations depicted in FIGS. 2-4 can be adapted for clusters that allow for multiple secondary target ports and allow for logical units to be reassigned to different secondary target port. In such instances, the node can determine each of the secondary target ports for each endpoint (e.g., logical unit) and determine whether each impacted node can access each of the secondary target port. If a particular secondary target port cannot be accessed by an impacted node, the node excludes that secondary target port from consideration. If all impacted nodes can access multiple secondary target ports, the node can analyze the various paths to each of the secondary target ports to determine the secondary target port that will provide the best performance for each endpoint.

ADDITIONAL EXAMPLE VARIATIONS

Figure 5:
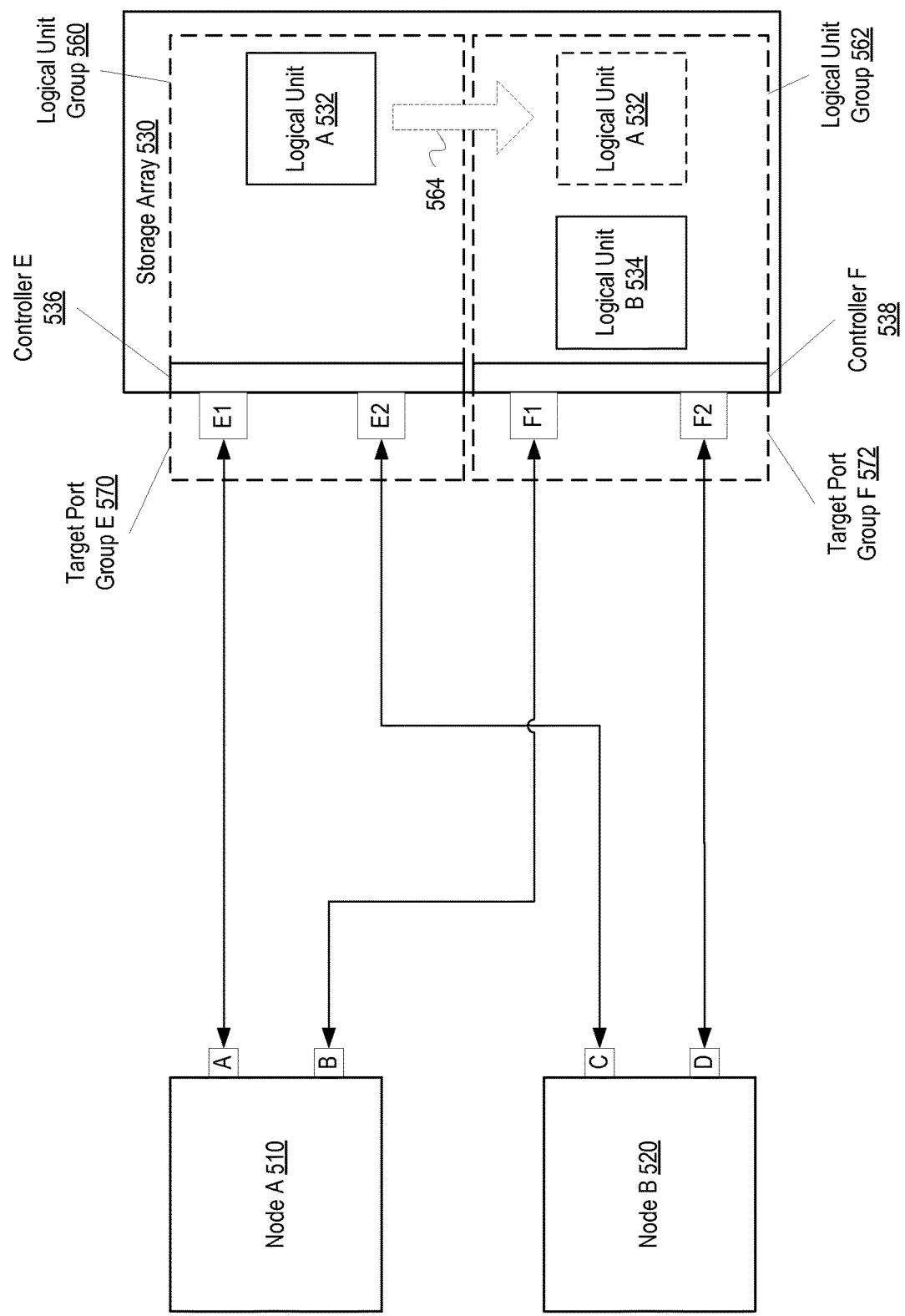
FIG. 5 depicts an example cluster with multiple target ports per controller and target port groups.

As mentioned at various points above, the particular cluster configuration can vary. This includes the configuration of the cluster manager, nodes, storage arrays, and other components. For the sake of simplicity, the example illustrations above focus on a particular configuration and a few variations. The following discussion, however, will describe more example cluster configuration variations and how the disclosures herein apply across the variations. The following examples are not exclusive and do not attempt to cover all of the possible cluster configurations. Thus, the following discussion should not be viewed as limiting, as the disclosures herein can be adapted for other cluster configurations as well. FIG. 5 will be used to illustrate variations as appropriate.

FIG. 5 depicts an example cluster with multiple target ports per controller and target port groups. FIG. 5 depicts cluster 500, node A 510, node B 520, and storage array 530. Storage array 530 includes controller E 536 and controller F 538. Storage array 530 includes logical unit A 532 and logical unit B 534.

Target Port Groups—The examples above refer to target ports associated with controllers. In some configurations, controllers can have multiple ports. Further, ports can be groups into "target port groups". The operations of a cluster, as they relate to determining the impact of a possible quiescence, can apply to target port groups in a manner similar to that of target ports. Further, logical resources can be assigned to target port groups similarly to being assigned to individual target ports.

For example, controller E 536 has two target ports, E1 and E2. Controller F 538 also includes two target ports, F1 and F2. Target ports E1 and E2 are configured as target port group E 570 and target ports F1 and F2 are configured as target port group F 572.

Logical Resource Groups—Logical resources, such as logical units, can be grouped together similar to target port groups. For example, some protocols allow for logical unit groups, which can comprise multiple logical units and can be assigned to target port groups. Logical units can be reassigned to different logical unit groups and logical unit groups can be reassigned to different target port groups. Logical resource groups are, in essence, another type of logical resource.

For example, FIG. 5 depicts logical unit group 560 and logical unit group 562, which are assigned to target port group E 570 and target port group F 572, respectively. logical unit A 532 and logical unit B 534 are assigned to logical unit group 560 and logical unit group 562, respectively.

When a controller has multiple target ports and logical resources are assigned to target port groups, nodes that might not be directly impacted by a component quiescence might still be indirectly impacted. Consider a scenario in which a single path might be quiesced. Assume, for example, that node A 510 receives a request to quiesce path A-E1, which might occur if a cable between initiator port A and target port E1 is replaced. An audit engine of node A 510 (not depicted) might determine that quiescing path A-E1 will result in the reassignment of logical unit A 532 to logical unit group 562, depicted by arrow 564. Thus, even though path C-E2 is not directly impacted by the quiescence of path A-E1, logical unit A 532 becomes unavailable to node B 520 via path C-E2 due to the reassignment.

Additionally, a node can be coupled with multiple target ports within a target port group. Thus, for example, if a single target port or path is being quiesced, the reassignment of a logical resource to a different target port group might be avoided. In such a scenario, an audit engine of a node might still determine that the logical resource should be reassigned based on comparing an analysis of the service level objectives and/or performance impact of the quiescence. For example, the audit engine might determine that reassigning the logical resource to another target port group will result in better performance than not reassigning the logical resource.

Active-Passive and Active-Active Storage Arrays—A storage array in which a logical resource is assigned to a particular storage array controller (whether directly or by virtue of being assigned to a particular target port/target port group) is sometimes referred to as an "active-passive" storage array. The controller to which a particular logical resource is assigned is the active controller, while the other controllers are passive controllers. Typically, if a request for a logical resource is sent to the passive controller, an error occurs.

Storage arrays can also be "active-active", such that all storage array controllers can service a particular logical resource. In an active-active storage array, a logical resource does not get reassigned to a different controller since the other controllers can already service the logical resource. However, the node still performs the analysis to determine whether the quiescence might cause the logical resource to be unavailable as well as analyzing the service level objectives (if appropriate) and the possible performance impact. For example, if a node only has a single path to an active-active storage array, and that single path is quiesced, the logical resources will still become unavailable to the node. As another example, if a node has multiple paths to an active-active storage array and one of the multiple paths is quiesced, the other paths will handle the traffic normally handled by the quiesced path. Thus, any service level objectives might be impacted as well as the performance of the cluster.

For the most part, the discussions above assumed that a single path was used to access a logical resource. Thus, for example, when one path was quiesced, a single alternate path generally handled all traffic from the quiesced. Clusters can, however, be configured to allow logical resources to be accessed via multiple paths. The operations described above can be adapted accordingly. For example, when analyzing the impact of a path quiescence on service level objectives, a node would take into account the capabilities and limitations of all paths that could be simultaneously used to access a particular logical resource.

Cluster configurations can also include more than two nodes, multiple storage arrays, and various networking components. Additionally, nodes and storage arrays can include more than two controllers. In cluster configurations that include multiple storage arrays, the analysis might also include a determination as to whether the logical resource can be migrated to a different storage array. Further, paths within a cluster need not be point-to-point, but can be paths arranged as any type of network topology, such as a mesh network topology.

The particular factors that go into analysis of the impact a potential quiescence might have and the impact the factors have on the analysis itself can vary. For example, the examples described above depict a determination that a particular endpoint would become unavailable as being a "fatal impact" that causes the analysis to halt. However, instead of halting the analysis, a node might perform the complete analysis. Performing the complete analysis allows the node to provide all information about the impact of the potential quiescence, which might be used by a process or user to decide to proceed with the quiescence regardless of the endpoint unavailability.

Similarly, the impact that a possible service level objective violation might have on the analysis can vary. For example, whether a service level objective violation results in the exclusion of a particular path from consideration as an alternate path might depend on the probability that the service level objective violation will occur. For example, assume that a service level objective for a logical resource specifies that the maximum throughput supported for the logical resource should be 1000 IOPS. If a particular alternate path only supports 900 IOPS but the maximum historical throughput for the logical resource has not exceeded 900 IOPS, a node might not exclude the alternate path from consideration. Similarly, the request to analyze the impact of a potential quiescence might specify a length of time for the quiescence and/or a particular time period that the quiescence will occur. A node can take such data into account, along with historical data associated with the cluster, when determining whether a particular path should be excluded or whether to recommend continuing with the quiescence. Using the above example, the node might determine although the maximum throughput for the logical resource has exceeded 900 IOPS, the actual quiescence is expected to be performed during a low traffic period in which the maximum throughput for the logical resource has not exceeded 900 IOPS. The node can also use historical data to determine time period in which the quiescence can occur while having minimal impact on service level objectives or cluster performance.

As part of the analysis, or in addition to the analysis, simulations or tests can be performed. Consider, for example, error rates along an alternate path. It might not be possible to determine what is causing errors on a particular path. Some error sources might be impacted proportionally to the traffic along that particular path. In other words, in some instances, increasing the traffic on a path might result in an increased error rate. In some instances, however, the error rate might be independent of the amount of traffic on the path. Thus, it might not be possible for the node to prospectively determine the specific impact certain factors might have. However, the node can gather additional data or verify an analysis by simulating or testing a switch to the alternate path before the actual action is taken. For example, prior to a controller being removed from a node, the node might redirect traffic across one or more alternate paths to simulate the conditions that would be present if the controller were removed. The node and/or other nodes can gather data during the simulation/test period and use the gathered data to determine the accuracy of the analysis or whether the analysis results should be overridden. The gathered data can be related to the various factors used during the analysis, including error rate, throughput, etc.

Target ports and target port groups are examples of interfaces that facilitate accessing of logical resources. Thus, target port identifiers and target port group identifiers are examples of interface identifiers. While a node might request that a second node identify paths to a logical resource by specifying the logical resource itself, the request would not identify a prospective configuration change. For example, if the node identified the logical resource itself, the second node might identify paths to the logical resource as the cluster is currently configured, not as the cluster might be configured after a component is quiesced. Thus, instead of identifying the logical resource itself, the node can identify the interface that the logical resource would be accessible to after the configuration change that would result from a component quiescence.

Further, because the analysis is prospective in nature, whether certain conditions will exist in the future might not be known. Consider the analysis of whether a service level violation is possible, for example. Because service level violations tend to be dependent on the current conditions of the cluster, it may be impossible to predict with certainty that a service level violation will occur. However, it may be possible to determine that the cluster conditions might result in a service level violation, as described in detail above. As another example, the quiescence of a component, at the time of the request for the impact analysis, might not be guaranteed. In other words, a decision to proceed with the quiescence might be made in response to the analysis. Thus, whether the component will actually be quiesced might not be known at the time the analysis is performed.

Similarly, a node might determine that the possibility of a particular event happening or characteristic exists. The node might then perform an additional analysis to determine further whether the event will happen or the characteristic will, in fact, exist. For example, at block 204 of FIG. 2, a node determines one or more logical unit(s) that are accessible via a particular path that would be impacted by the quiescence of a component. The fact that the logical unit(s) are accessible via the particular path means that the logical unit(s) might be inaccessible if the component is quiesced. The node then goes on to determine whether conditions will actually exist that result in the logical unit(s) being inaccessible. Thus, a node can ascertain whether conditions might exist without actually ascertaining whether the conditions will, in fact, exist. In other words, certain conditions can indicate that a logical resource might be inaccessible, while other conditions can indicate whether the logical resource actually is accessible.

As described above, the node indicates the results of the analysis to the cluster manager (or other entity that requested the analysis). The results can include a Boolean value (or similar) that indicates whether it is okay to quiesce the component. The specific "meaning" of such an indication can vary between configurations. For example, in some instances, a negative indication (e.g., "false" or "no") can mean that an endpoint will be unavailable if the component is quiesced. In some instances, a negative indication can mean that the performance of the cluster will be degraded greater than a certain percentage. Regardless, the node returns either an indication of a positive analysis outcome or a negative analysis outcome. The particular factors and conditions that go into determining whether the indication should be a positive analysis outcome or a negative analysis outcome can vary between configurations.

It should be noted that the term "logical unit number", or "LUN", is frequently used to refer to a particular logical unit. A LUN, however, is just an identifier of a particular logical unit. In some instances, a single logical unit might be identified by a particular LUN. For example, LUNs can be controller-specific. Thus, a particular logical unit by be identified by a first LUN 'x' when accessed via a first controller and by a second LUN 'y' when accessed via a second controller. Similarly, the LUN that identifies a particular logical unit might change.

As example flowcharts, FIGS. 2, 3, and 4 present operations in an example order from which storage systems can deviate (e.g., operations can be performed in a different order than illustrated and/or in parallel; additional or fewer operations can be performed, etc.). For example, while a node determines which nodes are impacted by the potential quiescence (block 208 of FIG. 2), the node might send indications of the potential quiescence to all nodes and allow the individual nodes to determine whether the quiescence might impact the particular node. For example, FIG. 3 depicts the operations of blocks 302-316 as occurring within a loop. Instead, a node can perform the operations of blocks 302-316 using asynchronous events. For example, the node can send requests to the impacted nodes (block 302 of FIG. 3) all at once. Then, when the node receives a response from a node (block 304 of FIG. 3) perform the related operations (blocks 306-316 of FIG. 3). The operations depicted at blocks 306-316 of FIG. 3 can be performed in parallel as well. As another example, FIG. 4 assumes that at least one service level objective is associated with the logical unit(s). In some instances, no service level objectives may be defined, thus permitting the node to skip the analysis depicted at blocks 408 and 410 of FIG. 4.

Further, loops depicted in the flowcharts may terminate at various points prior to completion of the loops. For example, a node might encounter an error while performing the operations of the loop depicted at blocks 300-318 of FIG. 3 that causes the loop to terminate prior to the analysis of all impacted nodes being completed. This can be in addition to other operations depicted that result in early termination of the loop (e.g., block 316 of FIG. 3). Similarly, loops identified as "for each" loops, such as the loop beginning at block 402 of FIG. 4, might terminate prior to each element being iterated over. In general, some operations not directly pertinent to the disclosures herein have not been depicted, and some of these operations might result in the processes depicted in the flowcharts terminating early.

As will be appreciated by one skilled in the art, aspects of the disclosures herein may be embodied as a system, method or computer program product. Accordingly, aspects of the disclosures herein may take the form of hardware, software (including firmware, resident software, micro-code, etc.) or a combination of software and hardware aspects that may all generally be referred to herein as a "circuit," "module" or "system." Furthermore, aspects of the disclosures herein may take the form of a program product embodied in one or more machine readable medium(s) having machine readable program code embodied thereon.

Any combination of one or more machine readable medium(s) may be utilized. The machine readable medium may be a machine readable signal medium or a machine readable storage medium. A machine readable storage medium may be, for example, a system, apparatus, or device that uses electronic, magnetic, optical, electromagnetic, infrared, or semiconductor technology, or a combination thereof. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the disclosures herein may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. Examples of a machine that would execute/interpret/translate program code include a computer, a tablet, a smartphone, a wearable computer, a robot, a biological computing device, etc.

Figure 6:
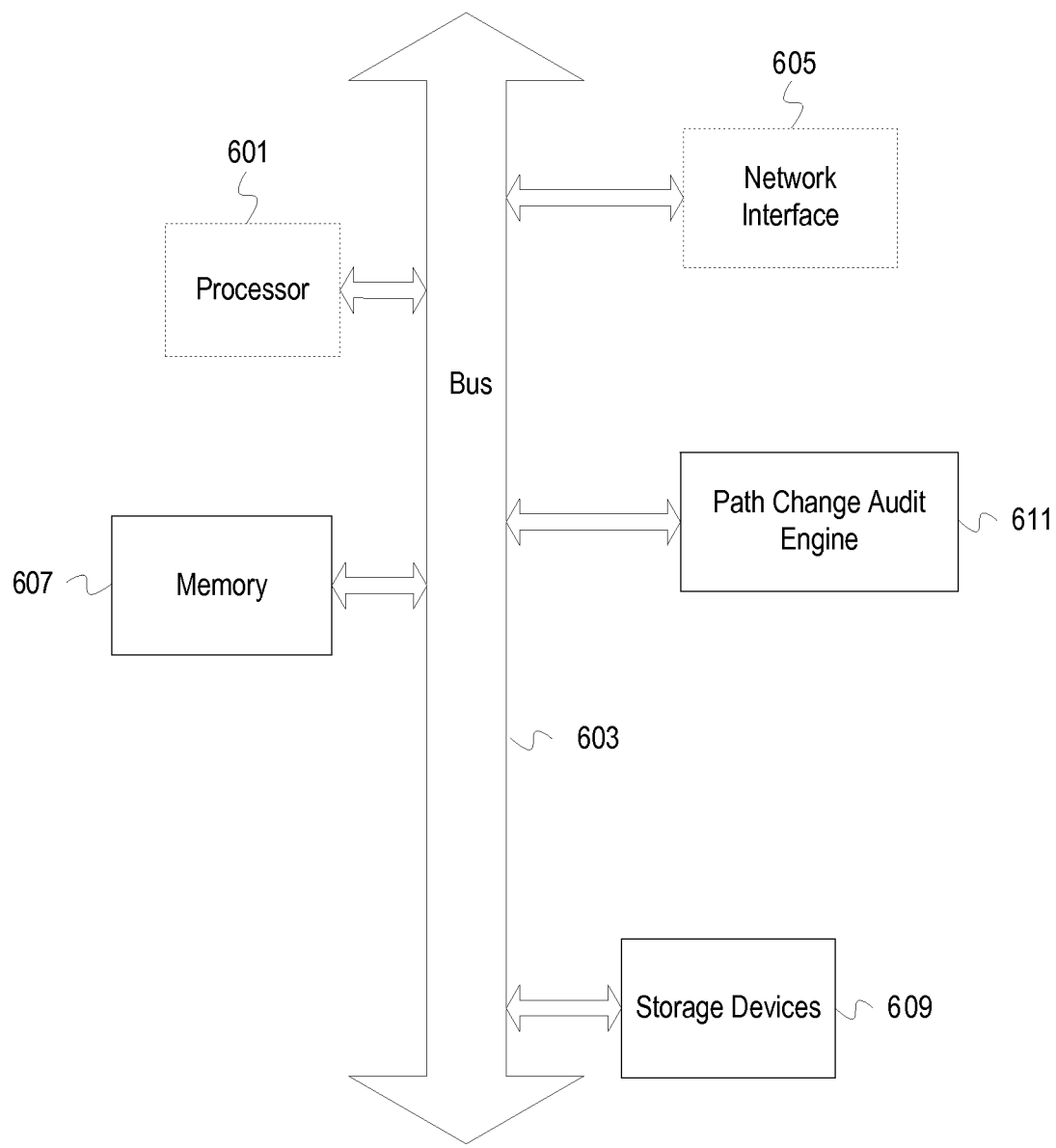
FIG. 6 depicts an example computing system including an audit engine.

FIG. 6 depicts an example computing system including an audit engine. The computer system includes a processor 601 (possibly including multiple processors, multiple cores, multiple nodes, and/or implementing multi-threading, etc.). The computing system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 603 (e.g., PCI, ISA, PCI-Express, Hyper-Transport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computing system also includes an audit engine 611. The audit engine 611 embodies functionality to implement the features described above. The audit engine 611 may include one or more functionalities that facilitate determining the impact of the potential quiescence of a component, path, etc. of a cluster. The audit engine 611 may include functionalities to determine whether the potential quiescence might result in a resource being inaccessible, a service level violation, a decrease in performance, etc. Any one of these functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601, the storage device(s) 609, and the network interface 605 are coupled to the bus 603. Although illustrated as being coupled to the bus 603, the memory 607 may be coupled to the processor 601.

While the examples are described with reference to various aspects and exploitations, it will be understood that these examples are illustrative and that the scope of the disclosures herein is not limited to them. In general, techniques for clustered storage system analysis as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosures herein. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosures herein.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
receiving, by an audit engine, a request to analyze an impact of quiescing a controller of a clustered storage array that comprises one or more logical units, wherein the request is sent by a cluster manager and includes information indicating a duration the controller might be quiesced for, and a particular time the controller might be quiesced;
analyzing, by the audit engine, a cluster configuration when quiescence of the controller indicated in the received request impacts an existing path between a node of a cluster and the one or more logical units of the storage array prior to the controller being quiesced;
determining, by the audit engine, whether the one or more logical units of the storage array is accessible to the node via a new path based on the cluster configuration if the controller is quiesced;
determining, by the audit engine, service level objectives associated with the one or more logical units accessible via the existing path; and
providing, by the audit engine, the new path the cluster manager upon the controller being quiesced when the impacted one or more logical units of the storage array is determined to be accessible to the node and when the new path can support the service level objective associated with the one or more logical units accessible via the existing path and service level objectives associated with the one or more logical units accessible via the new path.

2. The method of claim 1 further comprising assigning, by the audit engine, the one or more logical units of the storage array to a port associated with the node when the impacted one or more logical units of the storage array is determined to be accessible to the node.

3. The method of claim 1 further comprising determining, by the audit engine, when the service level objective associated with the one or more logical units accessible via the existing path violation occurs when the controller is quiesced.

4. The method of claim 1 further comprising determining, by the audit engine, a performance impact associated with quiescing the controller, the performance impact comprising a positive analysis outcome and a negative analysis outcome.

5. A non-transitory computer readable medium having stored thereon instructions for determining the impact of quiescing a component of a clustered storage system comprising machine executable code which when executed by a processor, causes the processor to perform steps to and that further comprise:

receive a request to analyze an impact of quiescing a controller of a clustered storage array that comprises one or more logical units, wherein the request is sent by a cluster manager and includes information indicating a duration the controller might be quiesced for, and a particular time the controller might be quiesced;

analyze a cluster configuration when quiescence of the controller indicated in the received request impacts an existing path between a node of a cluster and the one or more logical units of the storage array prior to the controller being quiesced;

determine whether the the one or more logical units of the storage array is accessible to the node via a new path based on the cluster configuration if the controller is quiesced;

determine service level objectives associated with the one or more logical units accessible via the existing path; and provide the new path the cluster manager upon the controller being quiesced when the impacted one or more logical units of the storage array is determined to be accessible to the node and when the new path can support the service level objective associated with the one or more logical units accessible via the existing path and service level objectives associated with the one or more logical units accessible via the new path.

6. The medium as set forth in claim 5 further comprising assign the one or more logical units of the storage array to a port associated with the node when the impacted one or more logical units of the storage array is determined to be accessible to the node.

7. The medium as set forth in claim 5 further comprising, determine when a service level objective associated with the one or more logical units accessible via the existing path violation occurs when the controller is quiesced.

8. The medium as set forth in claim 5 further comprising: determine a performance impact associated with quiescing the controller, the performance impact comprising a positive analysis outcome and a negative analysis outcome.

9. A computing device, comprising memory comprising programmed instructions stored in the memory and one or more processors configured to be capable of executing the programmed instructions stored in the memory to:

receive a request to analyze an impact of quiescing a controller of a clustered storage array that comprises one or more logical units, wherein the request is sent by a cluster manager and includes information indicating a duration the controller might be quiesced for, and a particular time the controller might be quiesced;

analyze a cluster configuration when quiescence of the controller indicated in the received request impacts an existing path between a node of a cluster and the one or more logical units of the storage array prior to the controller being quiesced;

determine whether the the one or more logical units of the storage array is accessible to the node via a new path based on the cluster configuration if the controller is quiesced;

determine service level objectives associated with the one or more logical units accessible via the existing path; and provide the new path the cluster manager upon the controller being quiesced when the impacted one or more logical units of the storage array is determined to be accessible to the node and when the new path can support the service level objective associated with the one or more logical units accessible via the existing path and service level objectives associated with the one or more logical units accessible via the new path.

10. The device as set forth in claim 9 wherein the one or more processors are further configured to be capable of executing the programmed instructions stored in the memory to assign the endpoint to a port associated with the node when the impacted one or more logical units of the storage array is determined to be accessible to the node.

11. The device as set forth in claim 9 wherein the one or more processors are further configured to be capable of executing the programmed instructions stored in the memory to determine when a service level objective violation occurs when the controller is quiesced.

12. The device as set forth in claim 9 wherein the one or more processors are further configured to be capable of executing the programmed instructions stored in the memory to determine a performance impact associated with quiescing the controller, the performance impact comprising a positive analysis outcome and a negative analysis outcome.

* * * * *